United States Patent [19]

Taratorin

[11] Patent Number: 5,355,261
[45] Date of Patent: Oct. 11, 1994

[54] METHOD AND APPARATUS FOR MEASURING ERROR RATE OF MAGNETIC RECORDING DEVICES HAVING A PARTIAL RESPONSE MAXIMUM LIKELIHOOD DATA DETECTION CHANNEL

[75] Inventor: Alex Taratorin, Palo Alto, Calif.

[73] Assignee: Guzik Technical Enterprises, Inc., San Jose, Calif.

[21] Appl. No.: 169,004

[22] Filed: Dec. 20, 1993

[51] Int. Cl.$^5$ .............................................. G11B 5/09
[52] U.S. Cl. ...................................... 360/53; 360/51
[58] Field of Search ...................... 360/53, 40, 46, 51, 360/36; 324/600, 601, 612, 613, 614, 615; 371/3, 5.1–5.5, 2, 4, 21.6, 23, 24

[56] References Cited

U.S. PATENT DOCUMENTS

| | | | |
|---|---|---|---|
| 3,169,084 | 8/1965 | Garrett et al. | 371/4 |
| 3,803,552 | 4/1971 | Barlow et al. | 371/4 |
| 4,578,721 | 3/1986 | Brannan | 360/51 |
| 4,740,968 | 4/1988 | Aichelmann, Jr. | 371/3 |
| 4,750,058 | 6/1988 | Hirt et al. | 360/67 X |
| 4,947,394 | 8/1990 | Nakajima et al. | 371/5.1 X |
| 5,077,739 | 12/1991 | Criswell | 371/3 |
| 5,121,263 | 6/1992 | Kerwin et al. | 360/53 |
| 5,123,020 | 7/1992 | Yoshimura et al. | 371/5.4 X |
| 5,233,482 | 8/1993 | Galbraith et al. | 360/46 |

OTHER PUBLICATIONS

Kerpez, "Viterbi receivers in the presence of severe intersymbol interference", pp. 2009–2013, Jan. 1990.
Palmer et al., "Media design considerations for a PRML channel" pp. 189–194, Jan. 1993.
Fitzpatrick et al., "A Maximum likelihood detector for Nonlinear Magnetic Recording", pp. 4816–4818, Nov. 1991.
Thapar & Patel, A Class Of Partial Response Systems For Increasing Storage Density In Magnetic Recording. IEEE Trans. On Mag., Sep. 1987, pp. 3666–3668. Sep. 1987.
Ziperovich, Performance Degradation Of PRML Channels Due To Nonlinear Distortions, IEEE Trans. On Mag., Nov. 1991, pp. 4825–4827. 1991.
Cideciyan, Dolivo, Herman, Hirt, & Schott, A PRML System For Digital Magnetic Recording, IEEE Journ. On Sel. Areas In Comm., Jan. 1992, pp. 38–56. Sep. 1992.
Wood & Petersen, Viterbi Detection Of Class IV Partial Response On A Magnetic Recording Channel, 34 IEEE Trans. On Comm. 454–461, 1986. 1986.
Howell, McCown, Diola, Tang, Hense & Gee, Error Rate Performance Of Experimental Gigabit Per Square Inch Recording Components, IEEE Trans. On Mag., Sep. 1990, pp. 2298–2302. 1990.

Primary Examiner—Donald Hajec
Assistant Examiner—Le Thien Minh
Attorney, Agent, or Firm—David Pressman

[57] ABSTRACT

A method for measuring the error rate of a magnetic recording device, such as a hard disk storing a set of data. The device has a partial response maximum likelihood data detecting channel (PRML channel) which differs from a conventional PRML channel by including a margin separator (58) which is connected between the output of A/D converter (54) and the input of a sequence detector (60). The system may contain a error counter (70) and data recovery units (66 and 68). The method consists mainly of changing the noise level in the samples received from the output of the A/D converter (54) and then counting the errors, and determining a dependence of a number of errors on a preselected criterion which characterizes a signal-to-noise ratio of the PRML channel. The above dependence can be extrapolated for an actual error rate of the channel being tested.

15 Claims, 5 Drawing Sheets

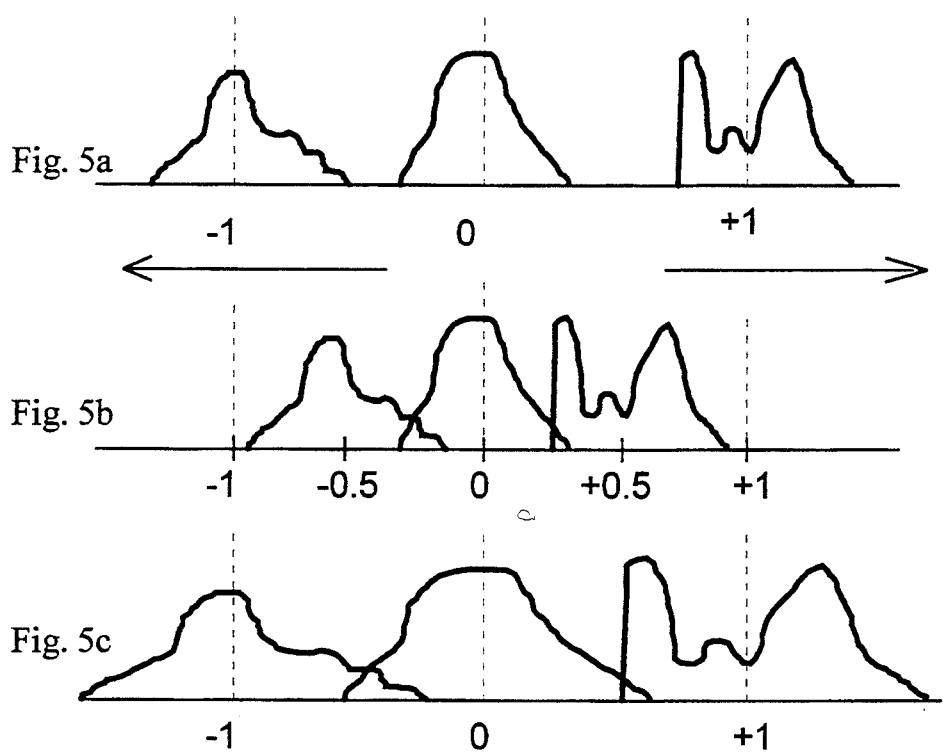
Fig. 5a
Fig. 5b
Fig. 5c
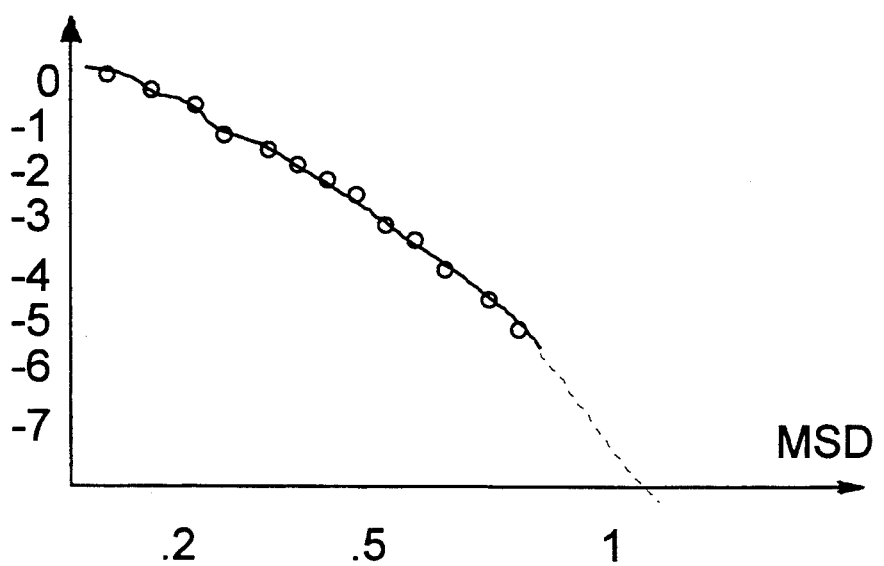
FIG. 6

METHOD AND APPARATUS FOR MEASURING ERROR RATE OF MAGNETIC RECORDING DEVICES HAVING A PARTIAL RESPONSE MAXIMUM LIKELIHOOD DATA DETECTION CHANNEL

BACKGROUND—FIELD OF THE INVENTION

The present invention relates to the field of magnetic recording, particularly to the measuring of an error rate for disk drives, based on the detection of data by means of a digital data processing method.

BACKGROUND—DESCRIPTION OF PRIOR ART

Definition of PRML—FIG. 1

Prior to assembling into computers or other data-processing apparatus, hard disks and read-write heads of computer disk drives are usually inspected and checked for various characteristics, such as signal-to-noise ratio, pulse width, asymmetry, etc. Error rate, the most universal indicator of the overall quality of the disk-drive components, is also checked.

Physically, an error rate is the number of errors allowable for a particular drive assembly during its operation. For hard disks, an error rate is a ratio of the number of errors per given number of bits written on the disk. For reliable operation of the disk, the error rate should be less than one error per $10^9$ or $10^{10}$ bits of recorded information.

Since the direct counting of absolute errors on such a huge number of bits requires an extremely long period of time, the error rate is usually evaluated indirectly, e.g., by probability methods, such as a bit-shift phase margin method disclosed in U.S. Pat. No. 4,578,721, issued in 1986 to Brannan, Jr. This method is based on changing the widths of windows in a data separator and counting the number of data pulses which fall beyond the prescribed windows. This method makes it possible to determine the dependence of the number of errors on the data window width and thus to extrapolate the relationship to the actual window width. This enables an actual error rate for the object being tested to be estimated in a relatively short period of time.

Although this method is rather efficient and finds wide application, it is applicable only to disk-drive channels operating on a peak-detection principle. However, the peak-detection principle is usable only in a system with a relatively low density of magnetic recording. This is because, with an increase in recording density, the width of the peak itself increases to the extent that it becomes of the same order of size or even greater that the distance between consecutive pulses.

Nowadays, however, a growing demand exists for recording with very high densities, and new methods are required to meet this demand. One solution to the above problem is a method which is known as partial response maximum likelihood (hereinafter referred to as PRML) which has recently begun to find ever-growing applications. A PRML is an electronic circuit which constitutes a part of a disk drive unit and is used for data detection.

The PRML is based on synchronously sampling readback signals coming from the read head. The selected signals are filtered (equalized), so that the sampling of a pulse to be detected produces a pre-defined sequence of values. The sequence which is used for the most popular type of PRML, and which is called the PR4 sequence, is shown in FIG. 1. This drawing shows two sequential sinusoidal waveforms and the positions of sample points. It can be seen that samples are taken sequentially only in the points where signals have only $+1$, $0$, and $-1$ values. This facilitates processing the data in a binary coded form.

When the detector observes a pair of $+1$ samples, it detects a positive pulse. Likewise, if a pair of $-1$ samples is observed, a negative pulse is detected. Therefore, one pulse written on a disk medium results in two samples (or more, depending on a particular PRML method). In other words, two samples are taken for each event, and therefore each point constitutes only a part of the response to the signal read by the head. From this particular definition the term "partial response" has been derived.

If two transitions are written closely enough, their readback pulses overlap. This is known as Inter-Symbol interference (ISI). ISI causes peaks in the signal to be shifted in time and their values to be reduced. This, in turn, causes errors in a peak detection channel. In contrast to this, in a PRML channel, the overlapping of pulses does not cause an error, because the assigned sequence is always preserved. This is shown in the right waveform in FIG. 1 where, in spite of the fact that the positive and negative pulses overlap, which is shown by broken lines, the sequence remains the same, i.e., 1, 0, $-1$.

Another advantage of a PRML channel is the use of the so-called Maximum-Likelihood (ML) detector, which is known also as a sequence detector, or a Viterbi detector in the field of digital communication. The ML detector stores the received sequences of samples and finds input data which are the nearest to the data received. Since such a method is based on an optimized selection of data in accordance with the sample sequence, it will improve the signal to noise ratio and reduce the channel error rate. The above-mentioned feature of the PRML method makes it highly advantageous for a high-density magnetic recording channel.

Typical Block Diagram of PRML—FIG. 2

A typical block diagram of a PRML channel is shown in FIG. 2. The system consists of the following sequentially connected units: an amplifier 20 which receives input signals, an equalizer 22, an analog-to-digital converter (ADC) 24, and a detector 26, which in some cases may be connected to ADC 24 through a digital equalizer 28. The output of the ADC is connected to a timing recovery unit 30 and to a gain recovery unit 32. The output of timing recovery unit 30 is fedback to the ADC, while the output of gain recovery unit 32 is fedback to amplifier 20.

Equalizer 22 modifies the shape of the recorded signal to a standard waveform acceptable for processing. ADC 24 samples the signals and converts them into digital form. From the output of ADC 24, the digitized signals are sent, via optional digital equalizer 28 which provides additional correction of the sample values, to detector 26. The same signal which is present at the output of the ADC is sent through a feedback loop to timing recovery unit 30 and to gain recovery unit 32. Timing recovery unit 30 controls the clock pulses which are used for timing the operation of the ADC. On the other hand, the feedback loop from gain recovery unit 32 to amplifier 20 adjusts the gain of amplifier 20 to the correct value.

In the above system, detector 26 receives at its input the above-mentioned PRML sequences of signals, which consist only of combinations of 0, +1, and −1.

Detector 26 detects the signals in accordance with the above-described maximum likelihood principle and produces the resulting data on its output. This is a particular set of data which is to have its error analyzed.

A general description of the application of the PRML principles for magnetic recording channels can be found in the following references: R. D. Cideciyan, F. Dolvio, R. Hermann, et al. "A PRML system for Digital Magnetic Recording" - *the IEEE Journal on Selected Areas in Communications,* vol. 10, No. 1, pp. 38–56, 1992; R. W. Wood and D. A. Petersen, "Viterbi Detection of Class IV Partial Response on a Magnetic Recording Channel" - *IEEE Trans. on Communications* vol. 34, No. 5, pp. 454–461, 1986; D. C. Palmer and J. D. Coker, "Media Design Considerations for a PRML Channel" - *IEEE Trans. Magnetics,* Vol. 29, No. 1, pp. 189–194, 1993.

The first commercially-available PRML disk drive was produced by IBM, and since that time, numerous and diverse architectures for future PRML products are being pursued by the electronics industry.

Existing Methods for Measuring Errors with PRML Channel

Having described the principle of the PRML method, we can now analyze the existing methods where a PRML channel is used for measuring errors, and, in particular an error rate.

Basically, the following four methods are known for the above purposes:

1. An approximate error rate can be estimated from theoretical calculations which can be found in the above three references. These calculations, however, are rough approximations of the realistic situation, because: a) they are based on a Gaussian noise assumption, which is not representative for a realistic magnetic read channel; b) they ignore non-idealities of the PRML system components (equalizer, timing loops, and gain loops); c) they ignore channel non-linearities (non-linear transition shift, timing asymmetry, and others).

2. Instead of measuring an error rate, the channel quality is estimated based on so-called amplitude margin histograms. This method is disclosed in U.S. Pat. No. 5,121,263, issued in June, 1992, to Kervin, et al. From the output of the ADC of the above-described PRML channel (FIG. 2), the signals are compared with their nearest nominal values, and the differences are accumulated in the form of a histogram. This histogram is then used for qualitative evaluation of the channel performance. While this method qualitatively characterizes the system's overall quality, it does not give a quantitative estimation of the system performance.

3. Direct Error Rate is counted on the system output, using a known input pattern of data which has been written to the disk, and an artificially created white noise mixed to the channel. See P. Ziperovich "Performance degradation of PRML channel due to nonlinear distortions" - *IEEE Trans. Magnetics,* pp. 4825–4827, 1991. Since this method uses an artificial noise source on the channel input, it ignores the realistic mixing of media and electronics noise which occurs in the system. Therefore, this method cannot result in correct evaluation.

4. Direct Error Rate is counted on the system output using a known input pattern of data which has been written to the disk and shifting the read-head position off the track center for creating an artificial error. This method is limited with respect to the estimation of the off-track system performance and thus does not characterize the overall performance of the channel. T. Howell, D. P. McCown, et al., "Error Rate Performance of Experimental Gigabit per Square Inch Recording Components" - *IEEE Trans. Magnetics,* vol. 26, No. 5, pp. 2298–2302, 1990.

Thus, none of the existing methods and apparatuses can measure an actual error rate, or evaluate an actual performance of the PRML channel without the use of complicated and time-consuming procedures.

OBJECTS AND ADVANTAGES OF THE INVENTION

Therefore several objects of the invention are to provide a method and an apparatus for the measurement of the error rate of a PRML channel which is suitable for high-density records, and insensitive to pulse overlapping; which utilizes a maximum-likelihood method of detection, and produces an improved signal-to-noise ratio; which is based on a realistic magnetic read channel, taking into account the non-idealities of the PRML system components, providing quantitative evaluation of the PRML channel performance, and which evaluates errors without the use of artificially created noise, or the displacement of the head from its correct position.

Another object is to simplify the error-rate evaluation procedure and make it possible to obtain estimated results in a reasonably short time.

Other advantages and features of the invention will become apparent from a consideration of the ensuing description and drawings.

BRIEF DESCRIPTION OF THE DRAWINGS

FIGS. 5a, 5b, and 5c show examples of transformations of amplitude margin histograms performed by the margin separator unit of FIG. 4, where: FIG. 5a is the original histograms on the ADC output; FIG. 5b is the results of the decrease in the margin separation distance from 1 to 0.5; and FIG. 5c is the scaling of shifted distributions performed by the margin separator.

FIG. 6 is an example of a margin separation plot which illustrates the effect of the margin separation distance on the number of errors.

Figure 1:
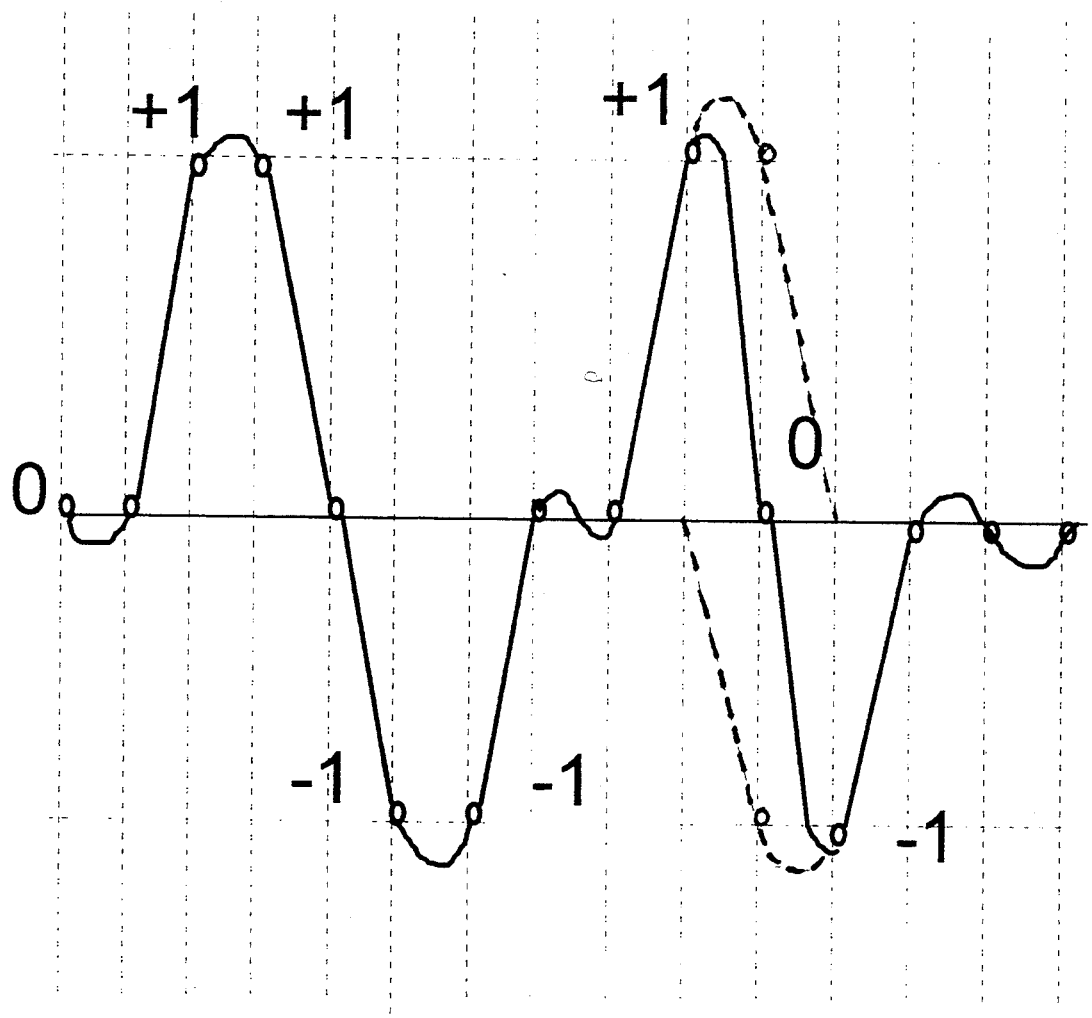
FIG. 1 is an example of a sinusoidal waveform with a sequence of sample points in accordance with a conventional PRML method.

REFERENCE NUMERALS USED IN THE DRAWINGS AND DESCRIPTION 20, 50—amplifiers
22, 52—equalizers
24, 54—analog/digital converters
26—maximum likelihood detector
28, 56—optional digital equalizers
30, 62—timing recovery units
32, 64—gain recovery units 58—margin separator unit
60—sequence detector
66, 68—data recovery unit
70—error counting unit

DETAILED DESCRIPTION OF THE INVENTION

Figure 3:
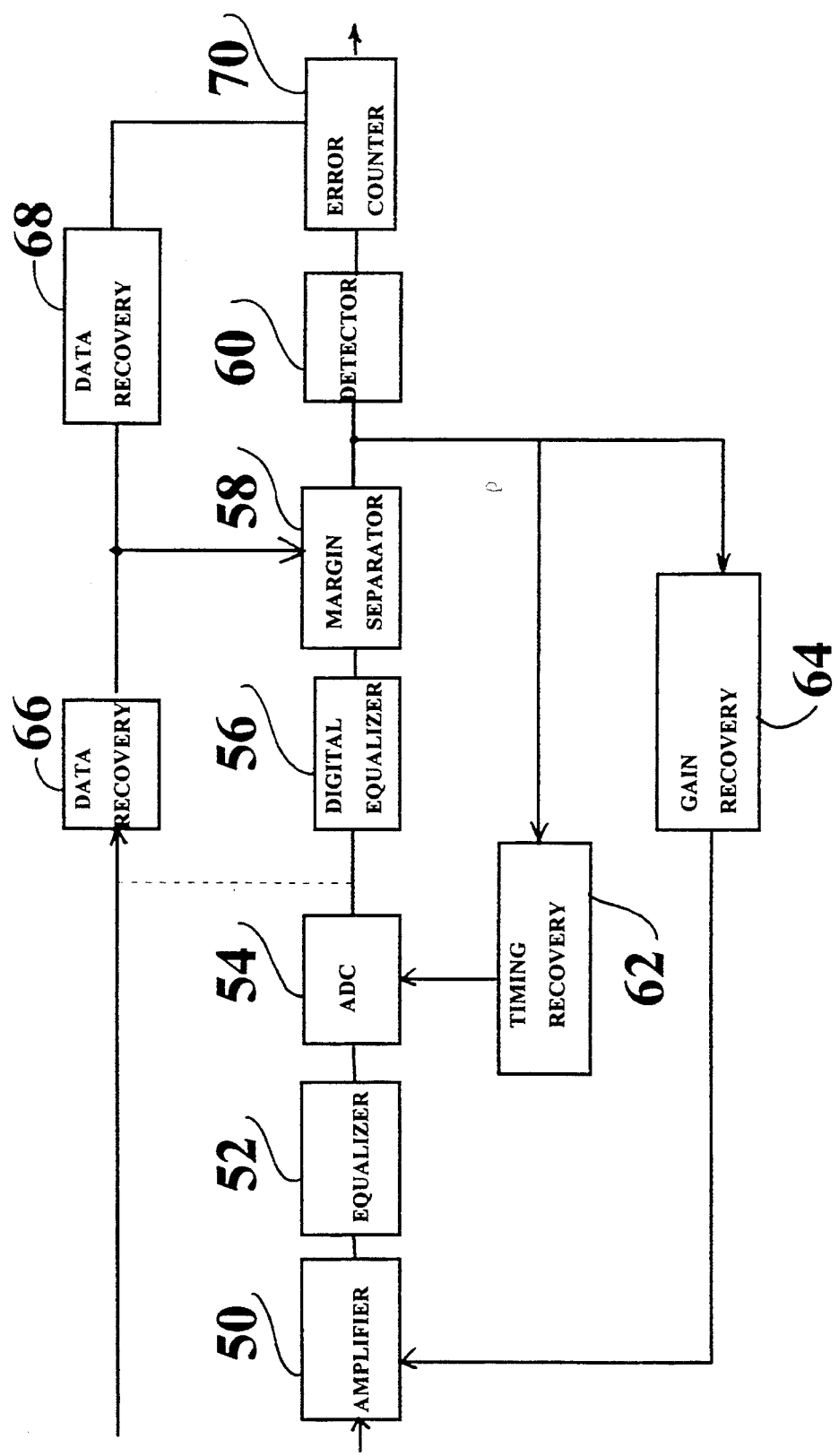
FIG. 3 is a block diagram of a PRML channel of the present invention.

Block Diagram of the System—FIG. 3

As has been mentioned above, a PRML channel is a part of a disk drive unit which is used for data detection. It has also been mentioned that the correct measurement of an error rate of a data storage unit, such as a hard disk, is an extremely important step, e.g., for characterizing the performance and quality control of different disk dive components.

A schematic block diagram of a PRML system of the present invention for measuring an error rate of a data storage unit is shown in FIG. 3. As shown in this drawing, the system consists of the following units connected in series: an amplifier 50 which receives input signals, e.g., from a read head (not shown), an equalizer 52, an analog/digital converter (hereinafter referred to as an ADC) 54, an optional digital equalizer 56, a margin separator 58, a sequence detector 60, and an error counting unit 70. An output of margin separator 58 is connected to a timing recovery unit 62 and a gain recovery unit 64. Timing recovery unit 62 has a feedback connection to the ADC, while gain recovery unit 64 has a feedback connection to amplifier 50.

The system also has data recovery units 66 and 68, which are connected to margin separator 58 and error counting unit 70, respectively. These units supply the correct known values of input data to margin separator 58 and error counting unit 70.

Figure 2:
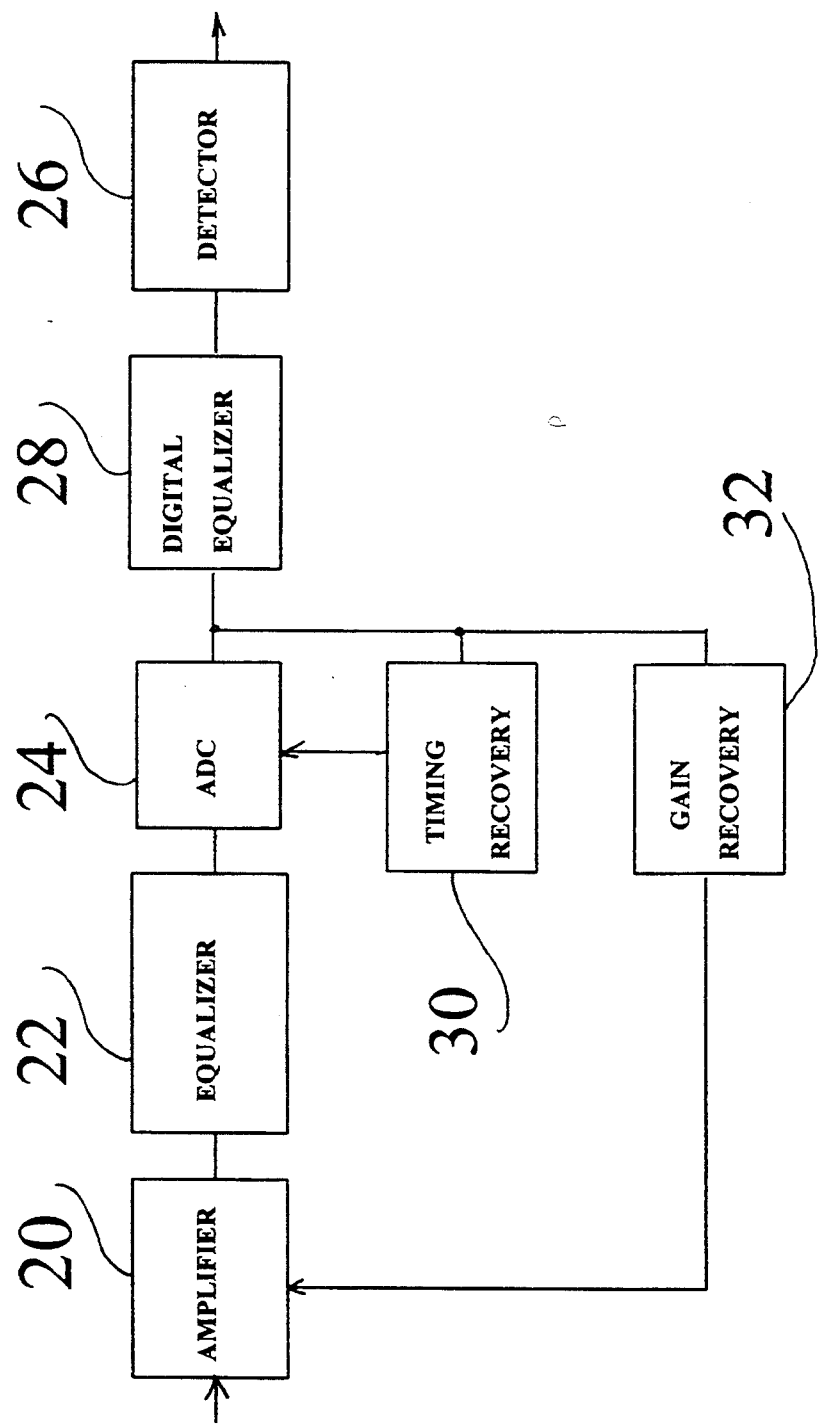
FIG. 2 is a typical block diagram of a prior-art PRML channel.

In fact, the PRML channel shown in FIG. 3 differs from the conventional PRML channel of FIG. 2 by the provision of margin separator 58 between digital equalizer 58 and sequence detector 60; error counting unit 70 connected to the output of sequence detector 60; and two data recovery units 66 and 68, connected to the inputs of margin separator 58 and error counting unit 70, respectively. These distinguishing features, however, impart to a PRML unexpected and advantageous properties, and allow measurements of error rates to an extent unattainable with conventional PRML channels.

All of the above-mentioned units of the system of FIG. 3, except for margin separator 58, are known and are produced by a number of companies. IBM Storage System Products Division (IBM Rochester, Minn. 55901) produces IBM 0681 PRML disk drive which includes all above-mentioned standard units of the PRML channel. Cirrus Logic Inc. (3100 W. Warren St., Fremont, Calif. 94538) produces CL-SH 3300 and SI-SH 4400 chip sets for PRML read channels which include all of the above units. A functionally similar set of chips (PCA842, PCA845, PCA854, PCA6080) for PRML channel is produced by GEC Plessey Semiconductors (1735 Technology Drive, San Jose, Calif. 95110).

Margin separator 58 can be manufactured in accordance with the circuit of FIG. 4, which will be described in detail later.

Operation

When the measurement of an error rate of a data storage unit is in progress, signals are transmitted from a read head of a tester (not shown) to amplifier 50. The latter amplifies the signal and sends it to equalizer 52 which modifies the shape of the input signal so as to obtain a standard waveform acceptable for processing. Equalizer 52 sends its output signal to ADC 54 which samples the analog signals and converts them into digital samples. If necessary, the digital samples are sent from the output of ADC 54 to a digital equalizer 56, which provides additional shaping of the sample values.

One of the most widely used schemes of data encoding for PRML is known as a PR-IV scheme. In this scheme, the ideal samples on the ADC output constitute only their nominal values 0, −1, +1, while for another scheme, which is known as a EPR4 scheme, these samples may take any of the following values: 0, +0.5, +1, −0.5, −1, etc. A description of different PR schemes used in magnetic recording may be found in the paper of H. K. Thapar and A.M. Patel, "A Class of Partial Response Systems for Increasing Storage Density in Magnetic Recording"- *IEEE Transactions on Magnetics*, vol. 23, No. 5, pp.3666-3668, 1987.

The sample values are then transmitted from digital equalizer 56 to margin separator 58, which sequentially detects the errors in each particular sample and amplifies the detected error value with a known gain coefficient. A modified signal on the output of margin separator 58 is obtained by adding correct value of each current sample with the corresponding magnified error value.

The modified signal is sent from the output of margin separator 58 to sequence detector 60, which detects the signal on the principle of maximum-likelihood detection, the definition of which has been given earlier.

From the output of margin separator 58, the signal is also sent to timing recovery unit 62, and to gain recovery unit 64. Based on the signals received through the feedback connection to ADC 54, timing recovery unit 62 restores a system clock, and thus maintains the operation of ADC 54 in correct phase with sampling. At the same time, gain recovery unit 64 provides gain adjustments for amplifier 50.

Data recovery unit 68 sends the known reference data samples to error counting unit 70, which compares the detected data with the known reference data and increments the count by 1, if an error is detected. Unit 66, which is functionally similar to unit 68, sends correct samples to the input of margin separator 58.

The above description concerns a flow of data from the read head to error counting unit 70. The following description will provide more detailed information on the functions of margin separator 58 and explain the principle of error rate measurements.

Figure 4:
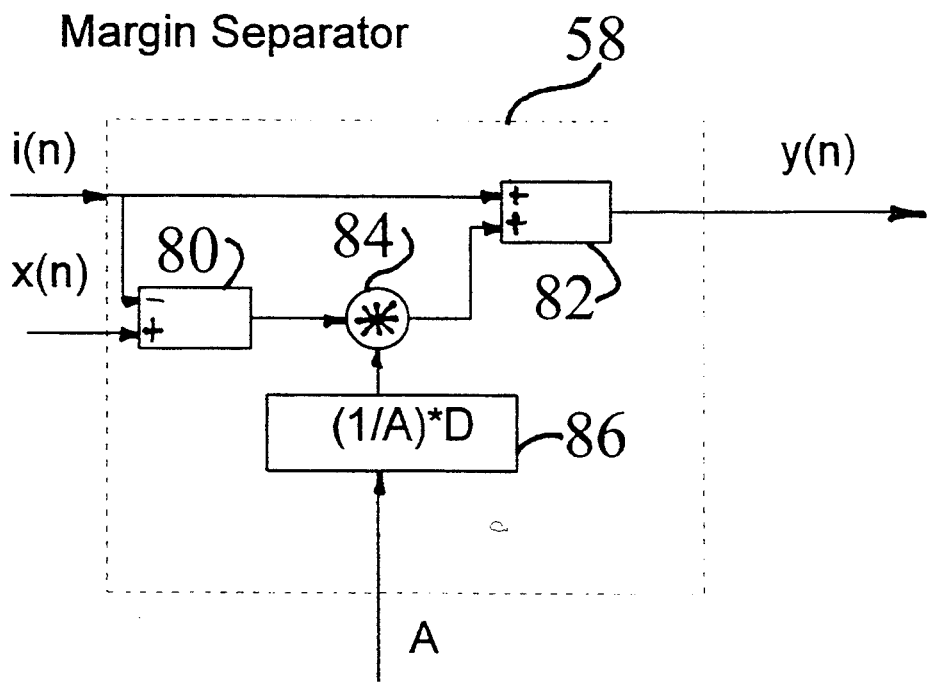
FIG. 4 is a block diagram of a margin separator unit of the PRML channel of FIG. 3.
Figure 4A:
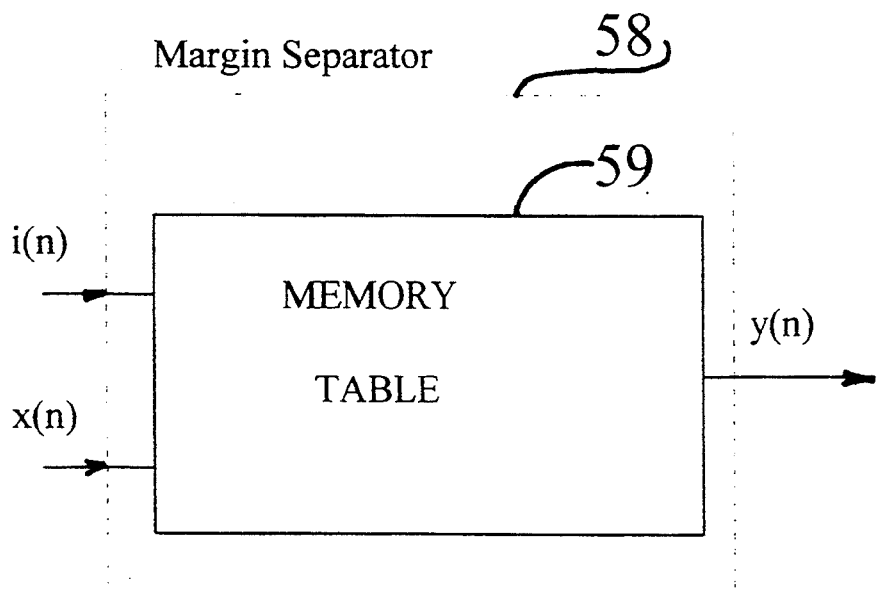
FIG. 4A is a block diagram of a margin separator unit of the PRML in the form of a memory table.

Block Diagram of the Margin Separator-FIGS. 4 and 4A

A schematic block diagram of margin separator 58 is shown in FIG. 4. The margin separator consists of a first adding unit 80, which is connected in parallel with a second adding unit 82 through a first input of a multiplier 84. A second input of multiplier 84 is connected to a scaling unit 86, the function of which is described below.

Input sample x(n) at a time instant n from the output of ADC 54 or digital equalizer 56 comes to the positive input of a first adding unit 80. The negative input of the same unit 80 is connected to the output of data recovery unit 68, which produces on its output a known ideal sample value i(n) of the input data stream. The same output of data recovery unit 68 is also connected to one of the positive inputs of second adding unit 82.

The smallest difference between different noise-free samples is called a margin separation distance (MSD). For example, for a PR-IV system where MSD=1, since samples are taking values −1,0 and +1. An input value A of the current margin separation distance (MSD) is applied to scaling unit 86; the output of this unit is represented as D/A, where D is the nominal value of the MSD for the particular partial response model used. The nominal values of D are: 1 for PR4, 0.5 for EPR4, etc. The output of scaling unit 86 and the output of first adding unit 80 are applied to multiplier 84; the output of the multiplier is connected to the second positive input of the adding unit 82. The output of adding unit 82, y(n), constitutes the output of the margin separator. The function of the margin separator is described by the following equation:

$$y(n) = i(n) + \frac{D}{A} \{x(n) - i(n)\} \quad (1)$$

FIG. 4A shows another embodiment of margin separator 58 in the form of a memory table. This may be an integrated-circuit chip (not shown) which contains memory with a programmed conversion table 59. Memory table 59 has two inputs, i.e., i(n) and x(n), and one output y(n). The meanings of these inputs and the output are the same as defined above with reference to FIG. 4.

Processing of Data in Margin Separator—FIGS. 5a to 5c

The functioning of the margin separator for the case of Partial Response class IV signals will now be explained.

First consider that D=A, and therefore that the output obtained from Eq. (1) is y(n)=x(n). As mentioned above, in an ideal system the data x(n) constitutes a sequence of values −1, 0, +1. In a practical situation, a number of system non-idealities distort these samples. Distortions are caused by media and electronics noise, non-linearities of the channel (non-linear transition shift, zigzag erasure, timing asymmetry), misequalization, noise in the timing and gain recovery loops, and others. As a result, samples x(n) deviate from their nominal values. For example, consider the following ideal sequence i(n) and corresponding ADC output sequence x(n) with the differences ε(n)=x(n)−i(n):

| n    | 1    | 2    | 3    | 4    | 5    | 6    | 7    | 8    | 9    |
|------|------|------|------|------|------|------|------|------|------|
| i(n) | +1   | +1   | 0    | 0    | 1    | 0    | +1   | 0    | 1    |
| x(n) | +.65 | +.78 | −.15 | −.65 | −.84 | +.32 | +.45 | +.24 | −.35 |
| ε(n) | −.35 | −.22 | −.15 | −.65 | .16  | .32  | −.55 | +.24 | +.65 |

As can be seen, ADC samples considerably deviate from their correct values. These deviations degrade the system performance and cause errors on the channel output.

For simplicity, let the sequence detector 60 used in FIG. 3 be a simple threshold detector. The threshold detector does not perform maximum likelihood processing, and uses the following decision rule: if an incoming sample is within the range −0.5<x(n)<0.5, then the output sample is decoded as "Zero"; if it is expressed as x(n)≧0.5, the output sample is detected as "+1," and if it corresponds to x(n)≦−0.5, the output sample is "−1".

Obviously, for the above example, the threshold detector will make errors at time instants n=4 (detecting "−1"instead of "0"), n=7 (detecting "0"instead of "+1"), and n=9 (detecting "0" instead of "−1"). At the same time, the maximum likelihood detector improves the detection quality by storing a sequence of samples and trying to predict the most probable sample sequence. By this way a maximum likelihood detector may still detect a correct sample sequence even in cases similar to the above example.

It is, however, to be expected, that in a reasonably good PRML system, the majority of samples x(n) are within a close range to their correct values and strong noisy outbursts similar to the considered above represent rare events.

A histogram of samples distribution on the output of ADC 54 provides a statistical characterization of sample deviation from their nominal values. An illustrative histogram of samples distribution for a PR-IV system is shown in FIGS. 5a. This histogram represents sample distributions around their nominal −1, 0, +1 set of values. Note that the partial distributions around −1, 0, +1 set of values are shown to be asymmetrical and contain peaks. This has been deliberately achieved here, in order to illustrate that positive and negative pulses can be distorted differently, and that their contribution to the error rate of the system is not the same.

To explain how the error rate of the PRML system is estimated by the margin separator 58, note that the differences between the actual ADC samples and the known input samples E(n)=x(n)−i(n) represent the total noise of the system. Such noise comes from a complex interaction of the media and electronics noise, distortions resulting from non-linearities of the channel, and errors of equalization, timing, and gain.

As demonstrated in the references cited earlier, (see previous references to D. Palmer, J. Coker, R. Wood, and D. A. Petersen), the error rate of the PRML channel is determined by the differences of the noise samples Δε(n)=E(n)−ε(k), where the index k<n and k takes all the integer values within the length of the sequence detector memory, being typically about 8–10 samples.

Detection error occurs if any of the differences Δε(k) becomes larger than some detection threshold (DT) value. This DT value is related to the margins separation distance (MSD) so that the larger value of MSD corresponds to a larger DT and vice- versa. For a PR-IV system, the MSD value and the DT value are identical, i.e., DT=MSD.

The probability density function $P_\Sigma(x)$ describing the realistic integral distribution of the noise differences is not known and cannot be estimated easily. However, the error probability for a particular MSD value equal to A can be formally written as the following integral of the unknown function $P_\Sigma(x)$:

$$P_{ER}(A) = \int_A^\infty P_\Sigma(x)dx \quad (2)$$

Equation (2) suggests a practical way for estimating the value of this integral: for a given MSD parameter a number of data errors $N_{ER}$ on the channel output can be counted. The ratio of number of errors to the total number of bits detected gives the estimate of the integral given by Eq. (2). Counting a number of errors for different MSD values, a number of integrals $P_{ER}(A_1)$, $P_{ER}(A_2)$, ..., are evaluated, giving the approximation to the integral noise distribution function.

Note that when the MSD is equal to its nominal value for any of the partial response models (e.g. MSD=1 for PR-IV or MSD=0.5 for EPR-IV etc. ), the corresponding DT value also equals its nominal value for the corresponding PR model. Thus, extrapolating the distribution function to the nominal value of MSD results in prediction of a realistic error rate of the system for any particular PR model used.

Thus, it has been demonstrated that by changing the MSD a simple parameter which controls the error rate of the PRML system can be modified without introducing any artificial modifications into the total system noise.

FIG. 5b, demonstrates what happens with the histogram of samples distribution when the MSD value is changed from 1 to 0.5 in a PR-IV system. The partial distributions, which were originally satisfactorily separated, now overlap, resulting in an increased error rate of the system.

In order to exclude problems associated with the direct change of the MSD parameter according to Eq. (2), we must scale the distributions shown in FIG. 5b so as to return the centers of the distributions to their nominal values and thus preserve the overall system gain. An example of such scaling procedure is shown in FIG. 5c, for a scaling coefficient equal to 2. The scaling operation is performed by margin separator 58 and is described by Eq. (1). The described procedure results in the effective "stretching" of the shifted partial distribution shown in FIG. 5b while at the same time preserving their particular shape. This "shape preservation" property illustrated in is very important, since it guarantees that statistical properties of the noise are not distorted. Thus, changing the degree of "stretching" of the partial noise distributions is equivalent to changing the value of MSD and, consequently, changing the value of the detection threshold.

The scaling described by Eq. (1) may also be interpreted as selective amplification of noise, while preserving the nominal signal level unchanged, thus degrading the signal- to-noise ratio. The linearity of this noise amplification operation guarantees that we do not introduce any artificial factors into the system.

Margin Separation Plot—FIG. 6

By changing the MSD parameter and measuring the corresponding number of errors on the PRML channel output for each value of A, we can obtain the dependence $P_{ER}(A)$ which characterizes the overall system performance. This is called here the Margin Separation Plot. At reasonably high signal-to-noise ratios, the error rate of the system for nominal values of MSD should be in the range of one error event per million(s) of bits written on the media. Therefore, only part of the distribution $P_{ER}(A)$ characterizing the higher error rate (up to $10^{-6}$ level) might be measured in a reasonable time for a range of values $A<D$, where D is the nominal MSD for the particular PR scheme employed.

FIG. 6 demonstrates the typical dependence of the error rate versus the MSD parameter. Using the smoothness of the distribution, this function may be extrapolated for the value of $A=D$, thus resulting in the prediction of the realistic error rate of the system. A rough analogy can be drawn between the size of the phase margin window utilized for peak detection, and the MSD. This is the performance indicator for the partial response method. The same analogy exists between the so-called bit-shift plot for the peak detection channel, and the margin separation plot for the PRML channel.

Summary, Ramification, and Scope

Thus, it has been shown that the present method and apparatus for the measurement of the error rate of a PRML channel is suitable for high-density records, and insensitive to pulse overlapping. The apparatus utilizes the maximum-likelihood detection, and produces an improved signal-to-noise ratio. Its operation is based upon a realistic magnetic read channel, takes into account the non-idealities of the PRML system components, provides quantitative evaluation of the PRML channel performance, and evaluates errors without the use of artificially created noise, or the displacement of the head from its correct position.

Furthermore, the method and apparatus simplify the error-rate evaluation procedure and make it possible to obtain the estimation results in a very short time.

Although the apparatus and a method for measuring the error rate have been shown and described in the form of specific embodiments, these embodiments, the steps of the method, and the units of the apparatus have been given only as examples, and many other modifications of the method and apparatus are possible. For example, the recording media to be tested is not limited to disks and may comprise magnetic tapes, etc.

At high signal-to-noise ratios, the circuit of the apparatus described with reference to FIG. 3 may also operate with unknown data set. In this case a priori unknown ideal samples may be approximated by the output of a threshold detector connected to the output of ADC 54, assuming that probability of error is negligible, comparing to the length of data stream used for error rate measurement.

In the circuit of FIG. 3, data recovery units 66 and 68 may have different structures, provided they fulfill the function specified.

Timing recovery unit 62 and gain recovery unit 64 may be connected to the output of ADC 54 or digital equalizer 56. In this case, the performance of timing and gain recovery units will be kept at a level corresponding to a rated system performance, while detection error will be determined by a signal modified in margin separator unit 58.

In the embodiment of FIG. 4 of the margin separator unit, a number of modifications can be made without affecting the scope of the invention. For example, scaling unit 86 may be omitted, assuming that the correct scaling value is fed to multiplier 84. The device may have a synchronization unit for synchronization of arithmetic operations between samples. Margin separation unit 58 can be realized in the form of a integrated circuit chip containing a memory table.

Therefore, the scope of the invention should be determined not by the examples given, but by the appended claims and their legal equivalents.

I claim:

1. A method for measuring the error rate of a magnetic recording device storing a set of data and having a partial response maximum likelihood data detecting channel, said channel having a predetermined set of values at which samples are taken and is set in accordance with a predetermined criterion, said method comprising the steps of:

changing said predetermined criterion in a noise increase direction to a value different from said predetermined criterion, thus producing a signal with increased noise;

reading at least a part of said set of data by means of said partial response maximum likelihood data detecting channel and obtaining a plurality of sampled signals;

counting a number of errors introduced into said sampled signals as a result of said steps of changing and reading; and determining a dependence of a number of errors on said value different from said predetermined criterion by repeating said steps of changing, reading, and counting;

extrapolating said dependence to said predetermined criterion and obtaining a number of errors corresponding to said predetermined criterion; and using said dependence and said number of error corresponding to said predetermined criterion as a measure for evaluation of the performance of said partial response maximum likelihood data detecting channel.

2. The method of claim 1 wherein said predetermined criterion comprises a margin separation distance between said samples.

3. The method of claim 2, further including modifying said signal with an increased noise in accordance with said predetermined set of values.

4. The method of claim I wherein said values of said predetermined set of values are $-1$, 0, and 1.

5. An apparatus for measuring the error rate of a magnetic recording device which stores a set of data, said apparatus comprising:

a partial response maximum likelihood data detection channel having a predetermined set of values at which samples are taken and is set in accordance with a predetermined criterion,;

margin separator means for changing said predetermined criterion in a noise increase direction to a value different from said predetermined criterion;

an error counting unit connected to said partial response maximum likelihood data detection channel; and at least one data recovery unit connected to said margin separator unit and to said error counting unit.

6. The apparatus of claim 5 wherein said partial response maximum likelihood data detection channel comprises the following elements connected in series:

an amplifier which receives said set of data and produces amplifier output signals;

a signal equalizing unit for equalizing said amplifier output signals, said signal equalizing unit producing a plurality of signal equalizing unit output signals;

signal sampling means for sampling said plurality of signal equalizing means output signals; and a sequence detection unit for determining the sequence in which said samples have been taken;

a timing recovery unit for timing said signal sampling means, said timing recovery unit being connected to said signal sampling means and to a point between said margin separator means and said sequence detection unit; and a gain recovery unit for controlling the gain of said amplifier, said gain recovery unit being connected to said amplifier.

7. The apparatus of claim 6 wherein said signal sampling means comprises an analog-to-digital converter.

8. The apparatus of claim 7, further including a digital equalizer connected between said signal sampling means and said margin separator means.

9. The apparatus of claim 7 wherein said margin separator means comprises at least:

a first adding unit;

a second adding unit; and a multiplier, said first adding unit being connected in parallel to said second adding unit through said multiplier.

10. The apparatus of claim 7 wherein said margin separator means comprises a memory table.

11. An apparatus for measuring the error rate of a magnetic read/write head and disk tester for testing read/write head or a disk, said disk storing a set of data, said apparatus comprising:

a partial response maximum likelihood data detection channel having a predetermined set of values at which samples are taken and is set in accordance with a predetermined criterion;

margin separator means for changing said predetermined criterion in the noise increase direction to a value different from said predetermined criterion, said margin separator means comprises at least:

a first adding unit;

a second adding unit; and a multiplier, said first adding unit being connected in parallel to said second adding unit through said multiplier;

an error counting unit connected to said partial response maximum likelihood data detection channel; and at least one data recovery unit connected to said margin separator unit and to said error counting unit.

12. The apparatus of claim 11 wherein said partial response maximum likelihood data detection channel comprises the following elements connected in series:

an amplifier which receives said set of data and produces an amplifier output signal;

a signal equalizing unit for equalizing said amplifier output signal, said signal equalizing unit producing a plurality of signal equalizing unit output signals;

signal sampling means for taking samples of signal equalizing means output signals, said signal sampling means comprising an analog/digital converter;

a sequence detection unit for determining the sequence in which said samples have been taken;

a timing recovery unit for timing said signal sampling means, said timing recovery unit being connected to said signal sampling means and to a point between said margin separator means and said sequence detection unit;

a gain recovery unit for controlling the gain of said amplifier, said gain recovery unit being connected to said amplifier; and a digital equalizer connected between said signal sampling means and said margin separator means.

13. An apparatus for measuring the error rate of a magnetic read/write head and disk tester for testing read/write head or a disk, said disk storing a set of data, said apparatus comprising:

a partial response maximum likelihood data detection channel having a predetermined set of values at which samples are taken and is set in accordance with a predetermined criterion;

margin separator means for changing said predetermined criterion in a noise increase direction to a value different from said predetermined criterion, said margin separator means comprising a memory table; and at least one data recovery unit connected to said margin separator unit and to said error counting unit.

14. The apparatus of claim 13 wherein said memory table is made in the form of an integrated circuit chip.

15. The apparatus of claim 13 wherein said partial response maximum likelihood data detection channel comprises the following elements connected in series:

an amplifier which receives said set of data and produces amplifier output signals;

a signal equalizing unit for equalizing said amplifier output signals, said signal equalizing unit producing a plurality of signal equalizing unit output signals;

signal sampling means for taking samples of said signal equalizing means output signals, said signal sampling means comprising an analog/digital converter;

a sequence detection unit for determining the sequence in which said samples have been taken;

a timing recovery unit for timing said signal sampling means, said timing recovery unit being connected to said signal sampling means and to a point between said margin separator means and said sequence detection unit;

a gain recovery unit for controlling the gain of said amplifier, said gain recovery unit being connected to said amplifier; and a digital equalizer connected between said signal sampling means and said margin separator means.

* * * * *